UNITED STATES PATENT OFFICE.

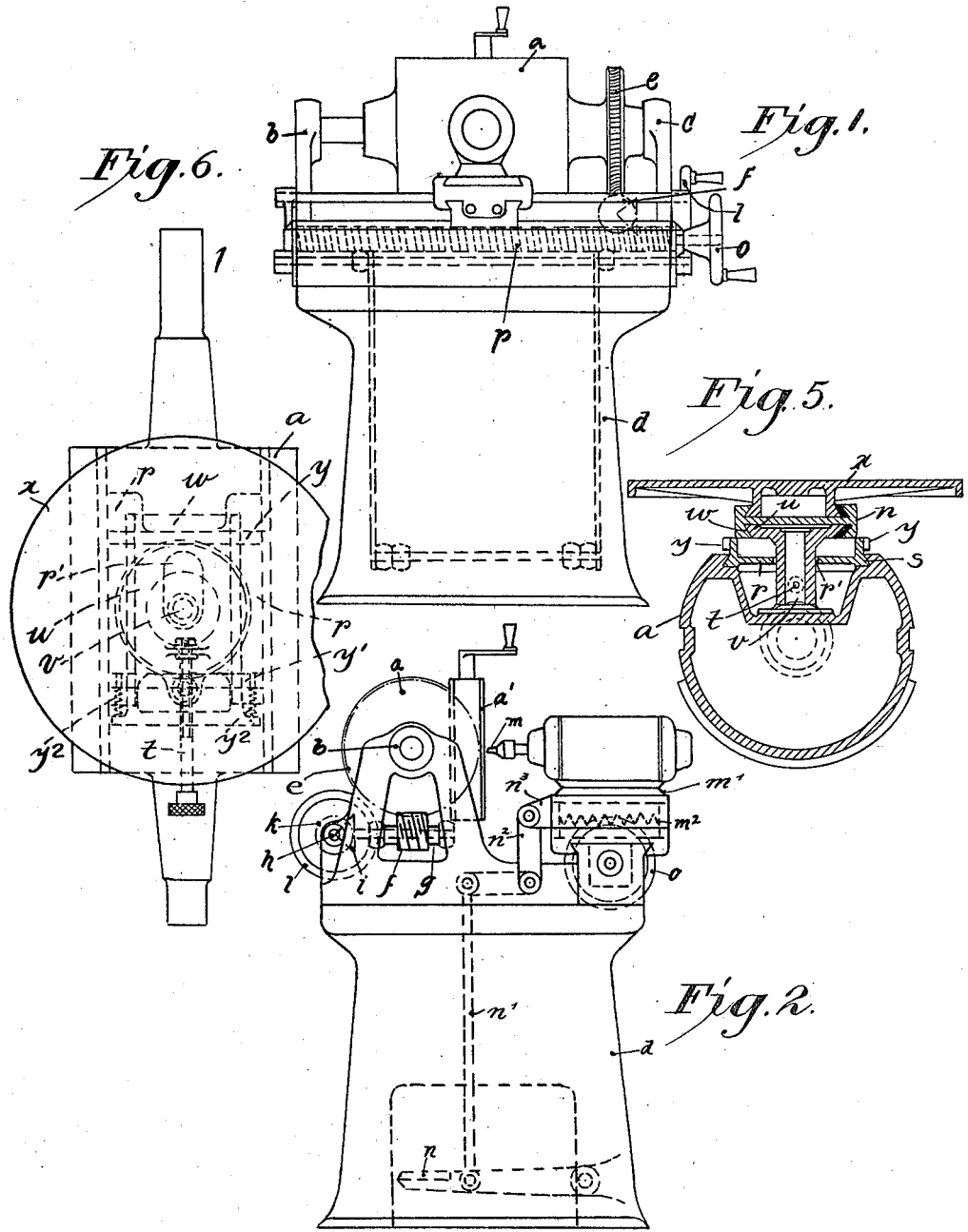

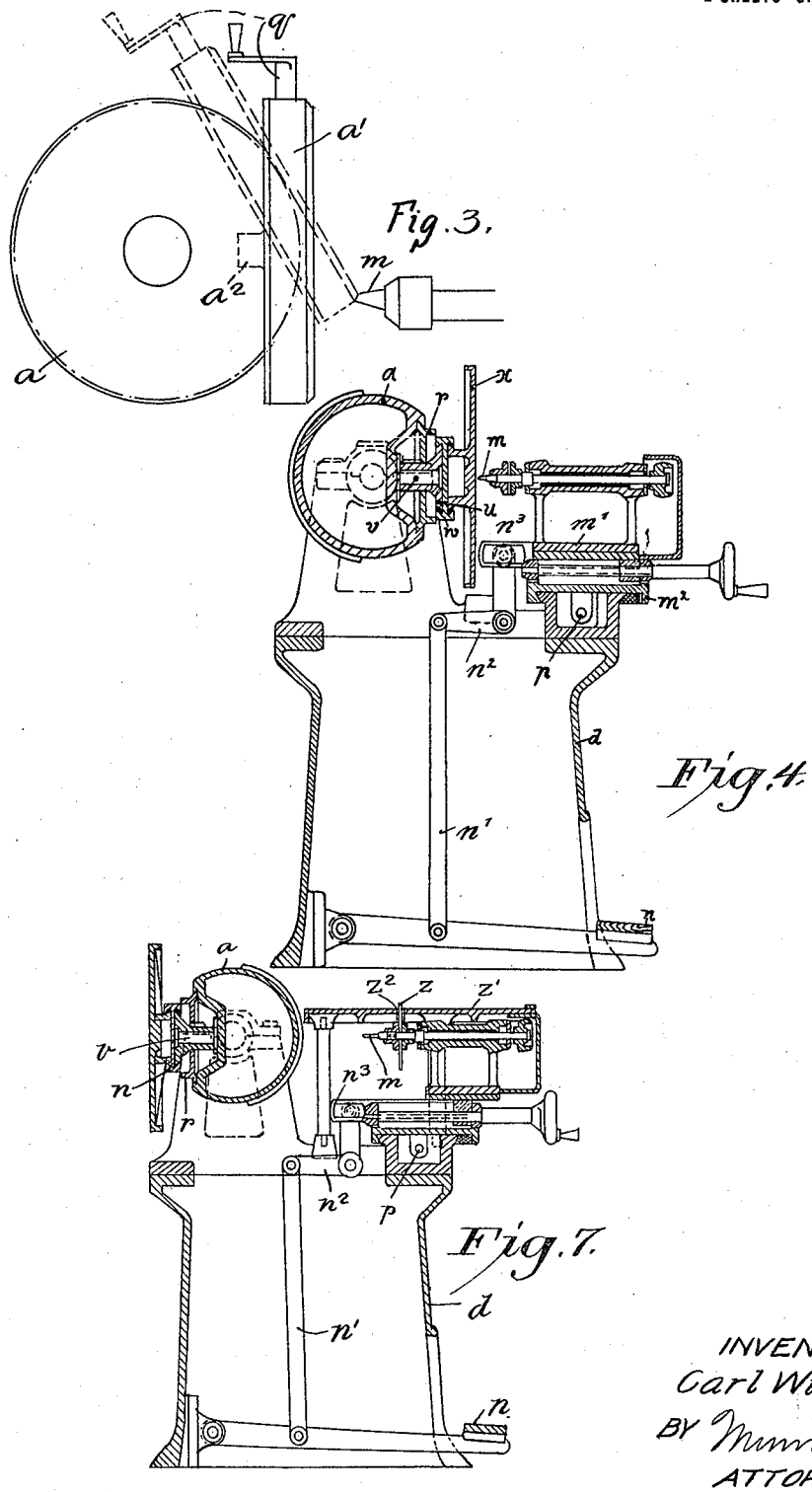

CARL WINKLER, OF BERNE, SWITZERLAND.

MACHINE FOR SHAPING PRINTING-PLATES.

1,320,301.  Specification of Letters Patent.  Patented Oct. 28, 1919.

Application filed May 21, 1915. Serial No. 29,588.

*To all whom it may concern:*

Be it known that I, CARL WINKLER, a citizen of the Swiss Republic, residing at Berne, in the Swiss Republic, have invented new and useful Improvements in Machines for Shaping Printing-Plates, of which the following is a specification.

At the present time separate machines are used for shaping curved and flat plates, zinc printing blocks, electros, etc. Many printers who use a large number of curved plates and are therefore naturally obliged to have a special machine for planing said plates, are nevertheless compelled to obtain a machine for shaping flat plates as well, even although each machine is perhaps not used more than one day in a week. Some manufacturers have tried to avoid this expense by fastening a flat table on the cylinder provided for carrying the curved plates, in order to be able to employ the same tool for shaping flat plates as is used for the curved plates. Because however the flat plates are commonly required when the machine is already being used for shaping curved plates, it is necessary in practice to unfasten and remove the curved plate just being worked on, and to attach the flat table and then the flat plate to be shaped. Afterward the same troublesome operations must be repeated in the reverse order, and it is clear that the time lost in waiting for the unfinished curved and flat plates is quite considerable.

According to the present invention these drawbacks are overcome by providing the cylinder for carrying the printing plates with both a curved and flat part, so that, in one angular position, it can be used for shaping a curved plate, and, in another angular position, for shaping a flat plate. The rotation of the cylinder is effected without any trouble or waste of time.

It is clear that by solving the problem in this way first costs are saved, the attendance is simplified, and the machine is therefore better able to pay for itself.

A further improvement incorporated in the new machine is the arrangement of the axis of the planing tool in a horizontal plane instead of in a vertical plane as heretofore. The plate to be shaped, whether curved or flat, is then of course supported in a vertical position. Trials have shown that when the plate has a vertical position the shaping operation can be carried out more easily, further that no devices for removing by blowing or suction the chips formed are required, because the chips fall down of themselves.

It is further of advantage to adapt the table provided on the flat surface of the cylinder to be turned about an axis normal to its top surface, in order by so doing to enable all four facets to be easily cut.

If desired said table may be combined with an apparatus for describing ellipses.

A further advantage of the horizontal arrangement of the cutting tool is that a circular saw may be fastened on the axis of said tool. Such a saw is often very useful in finishing off the plates.

On the drawing which illustrates the invention by way of example—

Figure 1 is a front elevation,

Fig. 2, a side elevation of a machine in which the cylinder provided for carrying the printing plates has both a curved and a flat surface, Fig. 3 shows the pivoted table for carrying flat plates, Fig. 4 is a vertical section through the machine combined with an apparatus for moving the table in an elliptical path, Figs. 5 and 6 represent said ellipse-apparatus in cross section and front elevation respectively.

Fig. 7 shows the attachment of a circular saw.

The cylinder or carrier $a$ is journaled in the bearings $b$, $c$ of the frame $d$ and can be turned by the worm wheel $e$ in which engages a worm $f$ turned by the spindles $g$, $h$, bevel wheels $i$, $k$ and hand wheel $l$. On one side of the cylinder $a$ there is a table $a'$ for flat plates, while the opposite side of the cylinder serves for fastening curved plates, which is preferably done by means of clamps. In front of the cylinder $a$ the cutting tool $m$ is mounted horizontally and it can be driven by any suitable means for example by an electromotor. On depressing a foot-lever $n$ the cutting tool will be moved toward the cylinder $a$ through the agency of the rod $n'$ and two-armed lever $n^2$ which engages in a projection $n^3$ attached to the slide $m'$. By means of a hand wheel $o$ (Fig. 1) the screw spindle $p$ can be turned, and by so doing the lower slide $m^2$, and, consequently, also the upper slide $m'$ and the cutting tool $m$, will be moved parallel to the axis of the cylinder $a$.

When using the machine for shaping curved printing plates said plates are placed on the cylinder $a$ and secured by clamps. The plate is then brought into the proper position in regard to the cutting tool by turning the cylinder $a$. If it is desired to cut a transverse groove in the plate the worm $f$ is turned by means of the hand wheel $l$, the cylinder $a$ being thus turned. The cutting tool is then put into operation and cuts a uniformly deep transverse groove. If it is also desired to cut a longitudinal groove in the plate the cylinder $a$ is brought into the proper position, whereupon the slide $m^2$ (including the inclosed motor and the cutting tool) is moved longitudinally by turning the hand wheel $o$.

If now it is desired to work on a flat plate, the cylinder $a$ is turned, so as to bring the table $a'$ around to a position facing the cutting tool, which is done by turning the hand wheel $l$. The flat printing plate is then attached. In order to cut a longitudinal groove in said plate the slide $m'$ is moved by turning the hand wheel $o$, while in order to cut a transverse groove the slide $m^2$ is kept stationary and the table $a'$ is moved by turning the hand wheel $q$, by doing which said table is moved longitudinally through the agency of a screw spindle.

It is clear that by adapting the table $a$ to turn about a middle pin $a^2$ and securing the cylinder at corresponding angles as shown in Fig. 3 the four facets can be easily cut.

When it is desired to cut elliptical curves any apparatus suitable for the purpose may be used. In the construction shown in Figs. 5 and 6 the slide $r$, which is provided with a circular flange $s$ and has a slot $r'$ in the middle, is adapted to move longitudinally in the cylinder $a$, in order to be able to adjust the axes of said slide $r$ and the pin $v$ at a distance apart according to the relative length and breadth of the ellipse desired. Against the circumference of the circular flange $s$ press the bars $y$, $y'$, which are attached to the slide $w$ carrying the table $x$, springs $y^2$ being provided to assure their continuous contact with said flange. This slide $w$ is carried by the pin $v$ through the agency of the slide $u$, which fits in a longitudinal groove in the slide $w$. The slide $u$ turns about the pin $v$, while the bars $y$, $y'$ turn about the flange $s$ on the slide $r$. If, in the position of the parts shown in Fig. 6, in which the center of the flange $s$ coincides with the center of the pin $v$, the slide $w$ is turned, the bars $y$, $y'$ bearing against the flange $s$ will cause said slide to turn in a circular path. If, however, the slide $r$ is moved longitudinally in the cylinder $a$ by turning the screw spindle $t$, so that the center of the flange $s$ is at some distance from the center of the pin $v$, on turning the slide $w$ about the pin $v$ it will be forced by the bars $y$, $y'$, owing to the eccentric position of the axes of the pin $v$ and flange $s$, to move longitudinally on the guide $u$ as well, and the combination of the turning motion about the pin $v$ and of the longitudinal motion on the guide $u$ due to the eccentric position of the flange $s$ causes said slide $w$ and the table $x$ carried by it to move in such a way that the fixed cutting tool will cut an ellipse on the work piece.

In Fig. 7 $z$ is a circular saw mounted on the axis of the cutting tool $m$. When the saw is used it is of advantage to employ a table $z'$ with a slot $z^2$, through which the saw $z$ projects (Fig. 7).

What I claim and desire to secure by Letters Patent of the United States is:—

1. A shaping machine for printing plates and the like, comprising in combination, a cutting tool, and a carrier for the plates having both a curved and a flat plate supporting surface and adapted to be turned to put either the curved or flat surface in position to be operated on by said tool, substantially as, and for the purpose set forth.

2. A shaping machine for printing plates and the like, comprising in combination, a practically horizontal cutting tool, and a carrier for the plates having both a curved and a flat plate supporting surface and adapted to be turned to put either the curved or flat surface in position to be operated on by said tool, substantially as, and for the purpose, set forth.

3. A shaping machine for printing plates and the like, comprising in combination, a practically horizontal cutting tool, a carrier for the plates having both a curved and a flat plate supporting surface and adapted to be turned to put either the curved or flat plate in position to be operated on by said tool, and a pivoted table attached to said carrier, substantially, as and for the purpose set forth.

4. A shaping machine for printing plates and the like, comprising in combination, a cutting tool, a carrier for the plates having both a curved and a flat plate supporting surface and adapted to be turned to put either the curved or flat surface in position to be operated on by said tool, and an apparatus for describing ellipses mounted on said carrier, substantially as, and for the purpose set forth.

5. A shaping machine for printing plates and the like comprising in combination a cutting tool, a reversible plate carrier, and means carried by the opposite sides of said carrier for holding a flat plate and a curved plate respectively.

6. A shaping machine for printing plates and the like comprising in combination a horizontally disposed cutting tool, an oscillatory carrier for the plates provided with flat and curved plate supporting surfaces, said carrier mounted to be oscillated to carry either plate to a position to be operated on by the said tool.

7. A shaping machine for printing plates and the like comprising in combination a cutting tool and a plate carrier member provided with flat and curved plate supporting faces, said carrier adapted to be turned to carry either plate to position to be operated on by said tool, said tool being horizontally disposed axially, and mounted to have horizontal movement perpendicular to the plate and also parallel therewith.

8. A shaping machine for printing plates comprising in combination a cutting tool and a plate carrier adapted to turn on a horizontal axis and having a flat plate supporting table and a curved plate supporting surface, said flat plate supporting table mounted on an axis perpendicular to its face.

In testimony whereof I have signed my name to this specification in the presence of two subscribing witnesses.

C. WINKLER.

Witnesses:
T. KRAMER,
F. STEPHEN.

Copies of this patent may be obtained for five cents each, by addressing the "Commissioner of Patents, Washington, D. C."